(12) United States Patent
Nakanishi et al.

(10) Patent No.: US 12,533,762 B2
(45) Date of Patent: Jan. 27, 2026

(54) MACHINE TOOL

(71) Applicant: DMG MORI CO., LTD., Yamatokoriyama (JP)

(72) Inventors: Tatsuhiro Nakanishi, Yamatokoriyama (JP); Tatsuhiko Kuriya, Yamatokoriyama (JP); Shigetsugu Sakai, Yamatokoriyama (JP)

(73) Assignee: DMG MORI CO., LTD., Yamatokoriyama (JP)

( * ) Notice: Subject to any disclaimer, the term of this patent is extended or adjusted under 35 U.S.C. 154(b) by 433 days.

(21) Appl. No.: 17/775,783

(22) PCT Filed: Nov. 10, 2020

(86) PCT No.: PCT/JP2020/041863
§ 371 (c)(1),
(2) Date: May 10, 2022

(87) PCT Pub. No.: WO2021/095714
PCT Pub. Date: May 20, 2021

(65) Prior Publication Data
US 2022/0379421 A1 Dec. 1, 2022

(30) Foreign Application Priority Data
Nov. 11, 2019 (JP) .................. 2019-204137

(51) Int. Cl.
*B23B 25/04* (2006.01)
*B23Q 11/08* (2006.01)
*B23B 3/06* (2006.01)

(52) U.S. Cl.
CPC .......... *B23Q 11/0825* (2013.01); *B23B 25/04* (2013.01); *B23B 3/065* (2013.01);
(Continued)

(58) Field of Classification Search
CPC .......... B23B 25/04; B23B 1/00–25/02; B23B 25/06–25/065; B23Q 11/08–11/0891;
(Continued)

(56) References Cited

U.S. PATENT DOCUMENTS 4,936,174 A 6/1990 Holy et al.
5,169,223 A * 12/1992 Suzuki .............. B23Q 11/0825
160/202

(Continued)

FOREIGN PATENT DOCUMENTS

CN       1899759 A  *  1/2007
CN     106881628 A  *  6/2017
(Continued)

OTHER PUBLICATIONS

IPEA/409, English translation of International Preliminary Report on Patentability Chapter II, for PCT application PCT/JP2020/041863, date of completion of report Feb. 4, 2022, six pages.*
(Continued)

*Primary Examiner* — Erica E Cadugan
(74) *Attorney, Agent, or Firm* — NIXON & VANDERHYE P.C.

(57) ABSTRACT

A machine tool includes a bed that includes a guide unit, a first structure and a second structure that are each mounted over the bed, a first drive unit that moves the first structure along the guide unit, and a protector that covers at least part of the first drive unit. The protector is extendable and retractable with movement of the first structure, at least one of the first structure and the second structure includes a protector housing portion that houses at least part of the protector, and the protector housing portion is a space that is provided in a base portion of at least one of the first structure and the second structure and opened in a movement direction of the first structure. Accordingly, structures such as a
(Continued)

headstock and a tool post can easily approach each other and the convenience of machining a workpiece by a machine tool can be increased.

18 Claims, 11 Drawing Sheets

(52) U.S. Cl.
CPC ........ *Y10T 29/5109* (2015.01); *Y10T 82/2537* (2015.01); *Y10T 82/2549* (2015.01)

(58) Field of Classification Search
CPC ......... B23Q 5/22–5/52; Y10T 82/2537; Y10T 82/2549; Y10T 82/2524; Y10T 409/30392
USPC ............ 82/135, 141, 129; 409/134; 160/224
See application file for complete search history.

(56) References Cited

U.S. PATENT DOCUMENTS

| | | | |
|---|---|---|---|
| 6,120,222 A | 9/2000 | Hiramoto et al. | |
| 7,412,759 B1 | 8/2008 | Hsieh et al. | |
| 2014/0373673 A1* | 12/2014 | Nagao | B23Q 11/0825 74/608 |
| 2019/0009380 A1* | 1/2019 | Sugiyama | B23Q 1/66 |
| 2021/0016358 A1* | 1/2021 | Deno | B23B 7/06 |

FOREIGN PATENT DOCUMENTS

| | | | |
|---|---|---|---|
| CN | 106881629 A * | 6/2017 | |
| CN | 108687564 A * | 10/2018 | |
| CN | 208811678 | 5/2019 | |
| DE | 102005043815 A1 * | 3/2007 | |
| GB | 316469 | 8/1929 | |
| JP | 58-93437 | 6/1983 | |
| JP | 2-269508 | 11/1990 | |
| JP | 4-57649 | 2/1992 | |
| JP | 11-291141 | 10/1999 | |
| JP | 2000-225536 | 8/2000 | |
| JP | 2002-11637 | 1/2002 | |
| JP | 2002-233926 | 8/2002 | |
| JP | 2003-245841 | 9/2003 | |
| JP | 2004-58182 | 2/2004 | |
| JP | 2007-50501 | 3/2007 | |
| JP | 2017-7071 | 1/2017 | |
| JP | 6227184 B1 * | 11/2017 | |
| KR | 1991-0009506 Y1 * | 12/1991 | |
| KR | 10-2018-0047077 | 5/2018 | |
| KR | 10-2019-0112913 | 10/2019 | |
| TW | M532924 U | 12/2016 | |
| WO | WO 2019/207842 | 10/2019 | |

OTHER PUBLICATIONS

Machine Translation of CN 1899759 A, which CN '759 was published Jan. 2007.*
Machine Translation of DE 102005043815 A1, which DE '815 was published Mar. 22, 2007.*
Notice of Reasons for Refusal of Japanese Patent Application No. 2021-556097 mailed Mar. 22, 2022, 14 pages (with English Translation).
International Search Report for PCT/JP2020/041863 dated Feb. 2, 2021, 7 pages.
Extended European Search Report dated Oct. 25, 2023 issued in European Patent Application No. 20887817.3, 8 pp.
Chinese Office Action dated Nov. 22, 2023 issued in Chinese Patent Application No. 202080077936.8 and English translation, 14 pp.
Second Chinese Office Action dated Mar. 28, 2024 issued in Chinese Patent Application No. 202080077936.8 and English translation, 14 pp.

* cited by examiner

MACHINE TOOL

| FIRST STRUCTURE IN THE FORM OF A TOOL POST | SECOND STRUCTURE IN THE FORM OF A HEADSTOCK |

*FIG. 1A*

MACHINE TOOL

| FIRST STRUCTURE IN THE FORM OF A TOOL POST | SECOND STRUCTURE IN THE FORM OF A TAILSTOCK |

*FIG. 1B*

MACHINE TOOL

| FIRST STRUCTURE IN THE FORM OF A STEADY REST | SECOND STRUCTURE IN THE FORM OF A HEADSTOCK |

*FIG. 1C*

MACHINE TOOL

| FIRST STRUCTURE IN THE FORM OF A STEADY REST | SECOND STRUCTURE IN THE FORM OF A TAILSTOCK |

*FIG. 1D*

MACHINE TOOL

This application is the U.S. national phase of International Application No. PCT/JP2020/041863 filed Nov. 10, 2020 which designated the U.S. and claims priority to JP Patent Application No. 2019-204137 filed Nov. 11, 2019.

TECHNICAL FIELD

The present invention relates to a machine tool.

BACKGROUND ART

In a machine tool, structures such as a tool post and a headstock are driven independently in X, Y, and Z directions, and a cutting process is performed on a workpiece placed on a spindle using, for example, a cutting tool placed on a tool post.

A structure placed over the bed of the machine tool typically moves along a guide rail provided on the bed. At that time, a ball screw is used for the movement of the structure. When cutting chips caused by the cutting process for the workpiece adhere to the ball screw, the ball screw can be damaged. To protect the ball screw from cutting chips, a protector for covering the ball screw is needed.

For example, PTL 1 suggests a telescopic cover for a machine tool, which includes a plurality of cover bodies overlapping inside and outside so as to be relatively movable and combined so as to extend and retract through the relative movement. In each pair of the cover bodies adjacent inside and outside, a pair of guiding members are provided on both side wall portions of the outside cover body to run in parallel to the extension and retraction direction, and a pair of guided members are provided to protrude in parallel to the extension and retraction direction from a base end portion of a side wall portion of the inside cover body, which is on the side of the outside cover body, toward the outside cover body and be engaged with the pair of guiding members so as to be each slidable.

CITATION LIST

Patent Literature

PTL 1: Japanese Laid-Open Patent Publication No. 2007-50501

SUMMARY OF INVENTION

Technical Problem

When a plurality of structures are placed over a bed and if a protector is disposed among the structures, the protector acts as an obstruction and the distance between the structures cannot be decreased easily. For example, in a machine tool that includes a first headstock, a second headstock, and one or more tool posts as structures, it is desirable in light of the convenience of machining a workpiece by the machine tool that the distance between the tool post and the first headstock or the second headstock can be controlled flexibly. However, if a protector is interposed between the first headstock or the second headstock and the tool post, it is difficult to position the tool post close enough to the first headstock or the second headstock.

Solution to Problem

In view of the above, an aspect of the present invention relates to a machine tool including a bed that includes a guide unit, a first structure and a second structure that are each mounted over the bed, a first drive unit that moves the first structure along the guide unit, and a protector that covers at least part of the first drive unit, where the protector is extendable and retractable with movement of the first structure, at least one of the first structure and the second structure includes a protector housing portion that houses at least part of the protector, and the protector housing portion is a space that is provided in a base portion of at least one of the first structure and the second structure and opened in a movement direction of the first structure.

Advantageous Effects of Invention

According to the above-described aspect of the present invention, a protector that protects a drive unit for moving a structure from cutting chips causes no large limitation on the structures approaching each other. Thus, the convenience of machining a workpiece by a machine tool can be increased.

While the novel features of the present invention are recited in the appended claims, the present invention, both as to organization and content, will be better understood, along with other objects and features of the present application, from the following detailed description taken in conjunction with the drawings.

BRIEF DESCRIPTION OF DRAWING

FIG. 1A schematically depicts portions of an alternative machine tool.

FIG. 1B schematically depicts portions of an alternative machine tool.

FIG. 1C schematically depicts portions of an alternative machine tool.

FIG. 1D schematically depicts portions of an alternative machine tool.

DESCRIPTION OF EMBODIMENTS

Figure 1:
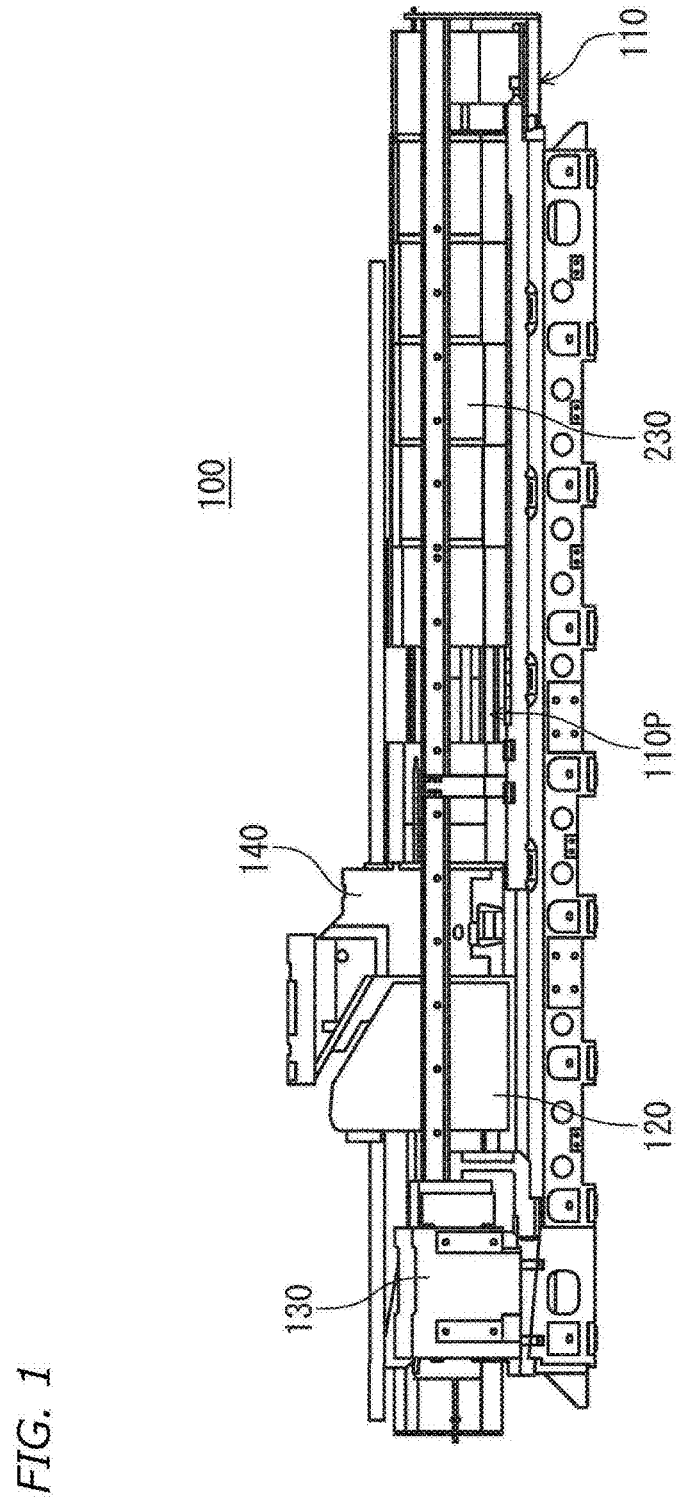
FIG. 1 is a front view illustrating a configuration of an example of a machine tool according to an embodiment.

A machine tool according to an embodiment of the present invention includes a bed that includes a guide unit, a first structure and a second structure that are each mounted over the bed, a first drive unit that moves the first structure along the guide unit, and a protector that covers at least part of the first drive unit. The protector is extendable and retractable with the movement of the first structure.

At least one of the first structure and the second structure includes a protector housing portion that can house at least part of the protector. For example, when at least part of the protector in a state of being retracted is housed in the protector housing portion, the distance between the first structure and the second structure can be decreased further than that in a case where no housing is performed. That is, the convenience of machining a workpiece by a machine tool can be increased without the protector causing large limitation on the structures approaching each other. It is desirable that the first drive unit be covered with the protector or a combination of the protector and another member so as to be wholly shielded from cutting chips.

The bed is a lower portion of the machine tool, which is placed over a floor, and has an upper surface over which the first structure and the second structure are mounted so as to be relatively movable. The bed may be a slanting type with an upper surface that slants. On the upper surface, a guide unit is disposed, which allows the first structure (or both of the first structure and the second structure) to move.

The guide unit may be a guide rail or be a sliding surface having no rail-like structure. The guide rail is formed so as to be integral with the bed or is formed separately from the bed and fixed to the bed. The guide unit, such as a guide rail or a sliding surface, is provided so as to run linearly over the upper surface of the bed. The number of guide units or guide rails is not particularly limited. While the configuration of the guide rail is not particularly limited either, a roller guide can be used for example. The roller guide includes a runner block and the linear motion of the first structure is guided by the runner block sliding on the guide rail via a rolling element (ball).

While the configuration of the first drive unit is not particularly limited, a ball screw is used for example as the first drive unit. The ball screw includes a shaft-like screw shaft, a motor for rotating the screw shaft, a bearing that supports the screw shaft, and a nut that moves on the screw shaft with the rotation of the screw shaft. The ball screw enables the position of the first structure to be controlled with high accuracy.

The protector is disposed at least between the first structure and the second structure so as to cover at least part of the first drive unit. The protector is just desired to be structured so as to be extendable and retractable with the movement of the first structure. The number of protectors that the machine tool includes is not particularly limited. For example, the machine tool including two second structures between which the first structure is sandwiched may have two protectors. In addition, another protector may be provided in a position other than that between the first structure and the second structure.

The protector includes, for example, a plurality of cover bodies, which are combined so as to be relatively movable and so that an adjacent pair of the cover bodies overlap at least partly. A telescopic cover can be presented as an example of such a protector. The telescopic cover is a multistage metallic cover, which extends and retracts through control of an overlap between the plurality of cover bodies using, for example, a pantograph, a spring, or the like.

Similar to the first structure, the second structure may also be movable on a guide unit, such as a guide rail. A ball screw can also be used for the second drive unit for moving the second structure along the guide unit. In this case, at least part of the second drive unit is also covered with a protector. It is desirable that the second drive unit be also wholly shielded from cutting chips. The first structure and the second structure may be structured so as to move along the guide units different from each other or be structured so as to move along the same guide unit.

Although examples of the machine tool can include a lathe, a machining center, a turn center with a turning function using a fixing tool and a milling function using a rotary tool, and an additive manufacturing (AM) machine that can perform a metal additive process, the machine tool is not limited to these. The combination of the first structure and the second structure is not particularly limited. For example, the first structure may be a tool post or a steady rest and the second structure may be a headstock or a tailstock. For another example, the first structure may be a table and the second structure may be a column where a spindle (spindle head) is placed.

For example, a form of the lathe includes at least one tool post (the first structure), and the first headstock and the second headstock (each the second structure). In this case, in addition to the tool post (the first structure), the second headstock (the second structure) may also be structured so as to be movable in relation to the first headstock (the second structure). Further, for example, the machining center includes at least a table (the first structure) for supporting a workpiece and a column (the second structure) where the spindle (spindle head) is placed.

Herein, the spindle or the headstock is a structure that includes a shaft, a motor, a transmission, and the like for applying rotation to a workpiece. The tool post is a structure where a cutting tool (tool) is attached, which is a flat type, a gang type, a turret type, or the like. The steady rest is a structure that supports the workpiece fixed to a grinder, the lathe, or the like in a radius direction. The tailstock is a structure that includes a member to be pressed against a workpiece so as to stabilize the workpiece. The table is a stage where a workpiece is fixed directly or indirectly using a mounting device of any kind, and typically, a feed motion or a cutting motion is applied.

The protector housing portion that houses at least part of the protector is just desired to be provided in at least one of the first structure and the second structure. For example, in the lathe that includes one tool post (the first structure) and the first headstock and the second headstock (each the second structure), the protector housing portion can be provided easily in the first headstock and the second headstock.

A first connection portion and a second connection portion of the protector, which are positioned away from each other in the extension and retraction direction, may be attached to the first structure and the second structure, respectively. For example, one end portion and the other end portion of the protector disposed between the first structure and the second structure, which are positioned in its extension and retraction direction, may be attached to the first structure and the second structure, respectively. Consequently, the protector can extend and retract easily with the movement of the first structure (and the second structure if the second structure is movable).

The protector housing portion is a space that is provided in a base portion of at least one of the first structure and the second structure and opened in the movement direction of the first structure (or the extension and retraction direction of the protector). Herein, to be opened in the movement direction of the first structure denotes that when a virtual plane blocking the opening is taken into account, the space is opened so that the plane and the movement direction of the first structure cross each other. Along the movement direction of the first structure, this space may be made through the first structure and/or the second structure where the space is provided or may not be made therethrough.

The protector housing portion is, for example, a space provided in the base portion of at least one of the first structure and the second structure and may be a tunnel-like space. The base portion is a lower portion of each structure. Such a space may be formed as a cast hole if the base portion of each structure is a casting.

The protector housing portion may be, for example, a space that is provided in the base portion of the first structure and opened toward the second structure. Along the movement direction of the first structure, this space may be made through the first structure or may not be made therethrough.

The protector housing portion may be, for example, a space that is provided in the base portion of the second structure and opened toward the first structure. Along the movement direction of the first structure, this space may be made through the second structure or may not be made therethrough.

The protector housing portion may be, for example, a space that is provided in the base portion of at least one of the first structure and the second structure and lies along the movement direction of the first structure. Along the movement direction of the first structure, this space may be made through the first structure and/or the second structure where the space is provided or may not be made therethrough.

The protector may be supported by, for example, a long member (which may be referred to as "first support member") provided along the movement direction of the first structure. As the long member, a rod member can be used, such as a rope or a round bar. When the protector is supported by the provided long member, the necessity to support the protector with the upper surface of the bed is obviated and the degree of freedom for the movement of the protector can be increased. The protector and the protector housing portion may be structured so that the protector can pass through the protector housing portion.

The long member may be provided almost all over the region of the upper surface of the bed from one end to the other end of the bed. When, for example, X represents the maximum length of the bed, the long member is provided by the distance longer than or equal to 70% of X or the distance longer than or equal to 80% of X. One end portion and the other end portion of the long member are just desired to be each supported by a predetermined fixing member at one end and the other end of the bed, respectively.

When the protector is supported by the long member, the protector may be provided with a rotor that travels along the long member so as to facilitate the movement of the protector during the extension and retraction. For example, the rotor is preferably a pulley, a cam follower, or the like that travels along the long member.

At least one of the first structure and the second structure may include at least one support member (which may be referred to as "second support member") that supports the long member. In this case, the long member can be supported at a plurality of support points that include the predetermined fixing members at the both ends of the bed and the support member. As a result, loosening of the long member can be inhibited and resistance to the extension and retraction or movement of the protector can be decreased.

Embodiments of the machine tool according to the present invention are described in more detail below by referring to the accompanying drawings. Although in the description of the embodiments, terms indicating directions (such as the "horizontal direction" or the "longitudinal direction") are used where appropriate so as to facilitate understanding, these terms are intended for explanation and not intended to limit the present invention. To clarify the shape or features of each component of the machine tool, the dimensions thereof are illustrated as relative ones in each figure. However, the illustration is not necessarily based on an identical scale. In addition, identical reference signs are used for identical components in each figure.

Figure 2:
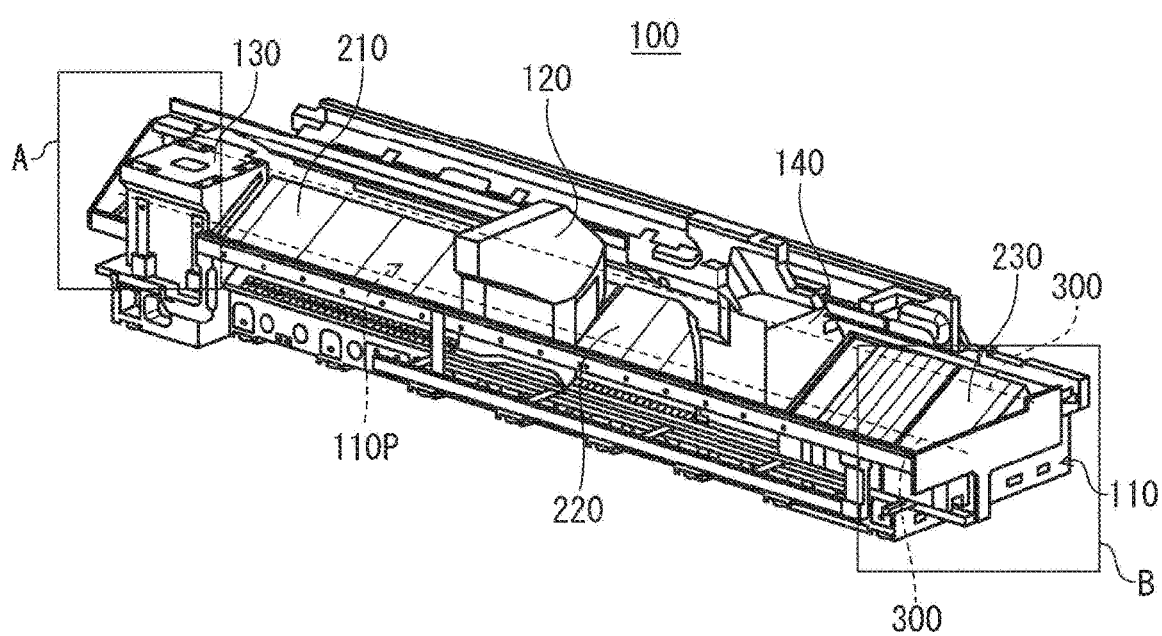
FIG. 2 is a perspective view illustrating a configuration of an example of the machine tool.
Figure 3A:
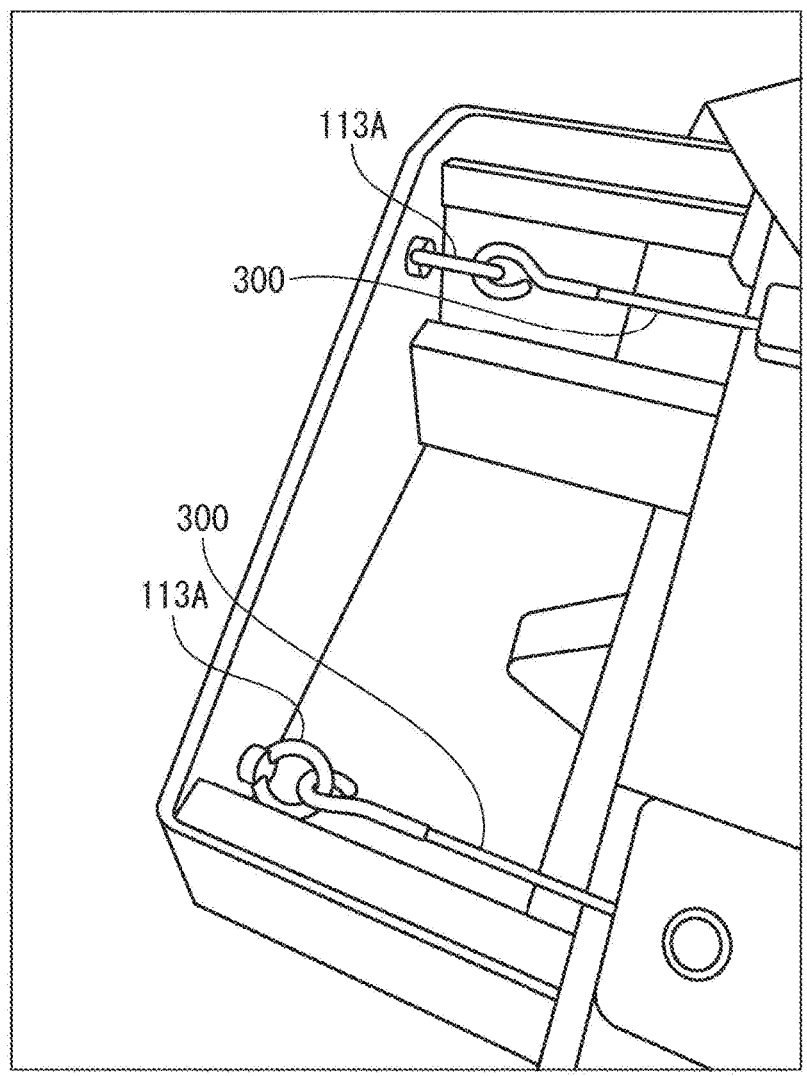
FIG. 3A is an enlarged view of a region A in FIG. 2.
Figure 3B:
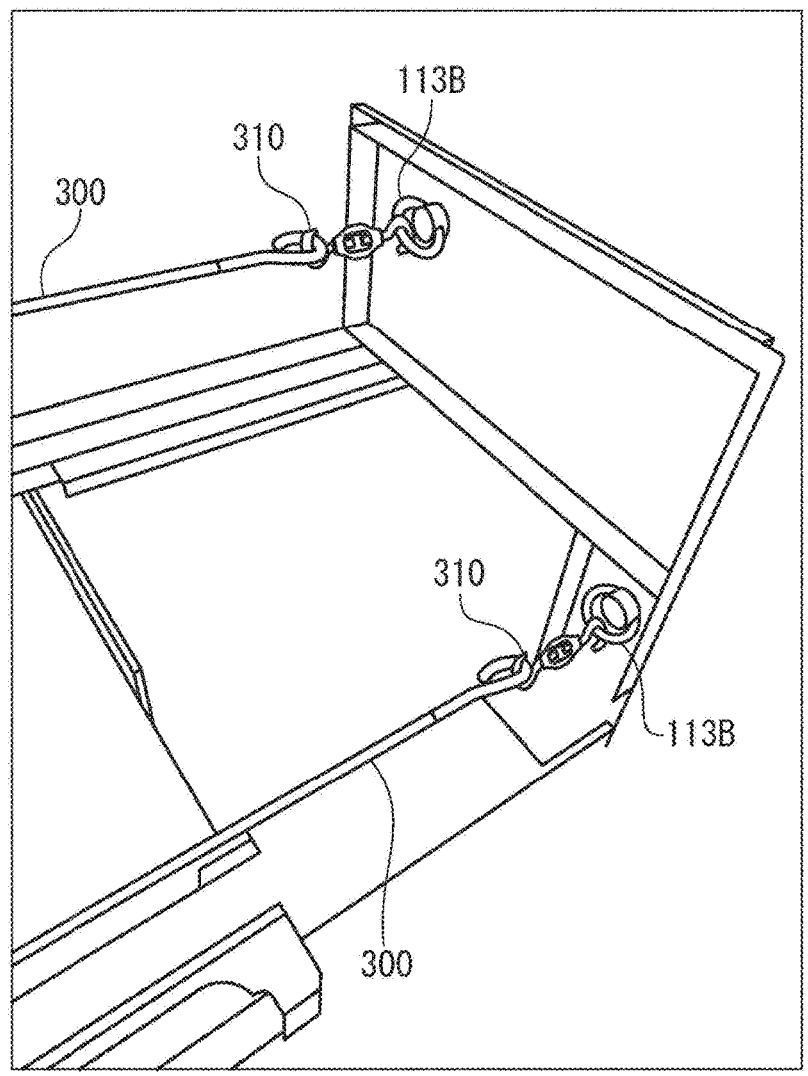
FIG. 3B is an enlarged view of a region B in FIG. 2.
Figure 4:
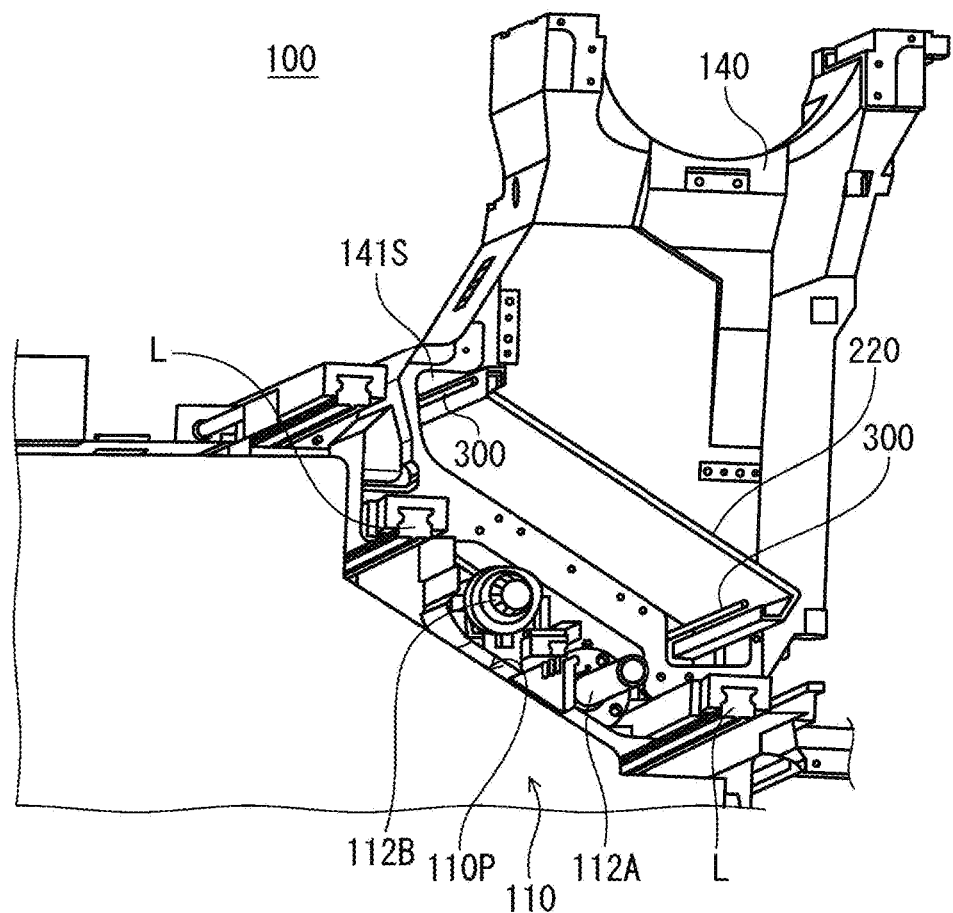
FIG. 4 is a perspective view of a protector housing portion of a second headstock, which is viewed obliquely from the lower side.
Figure 5:
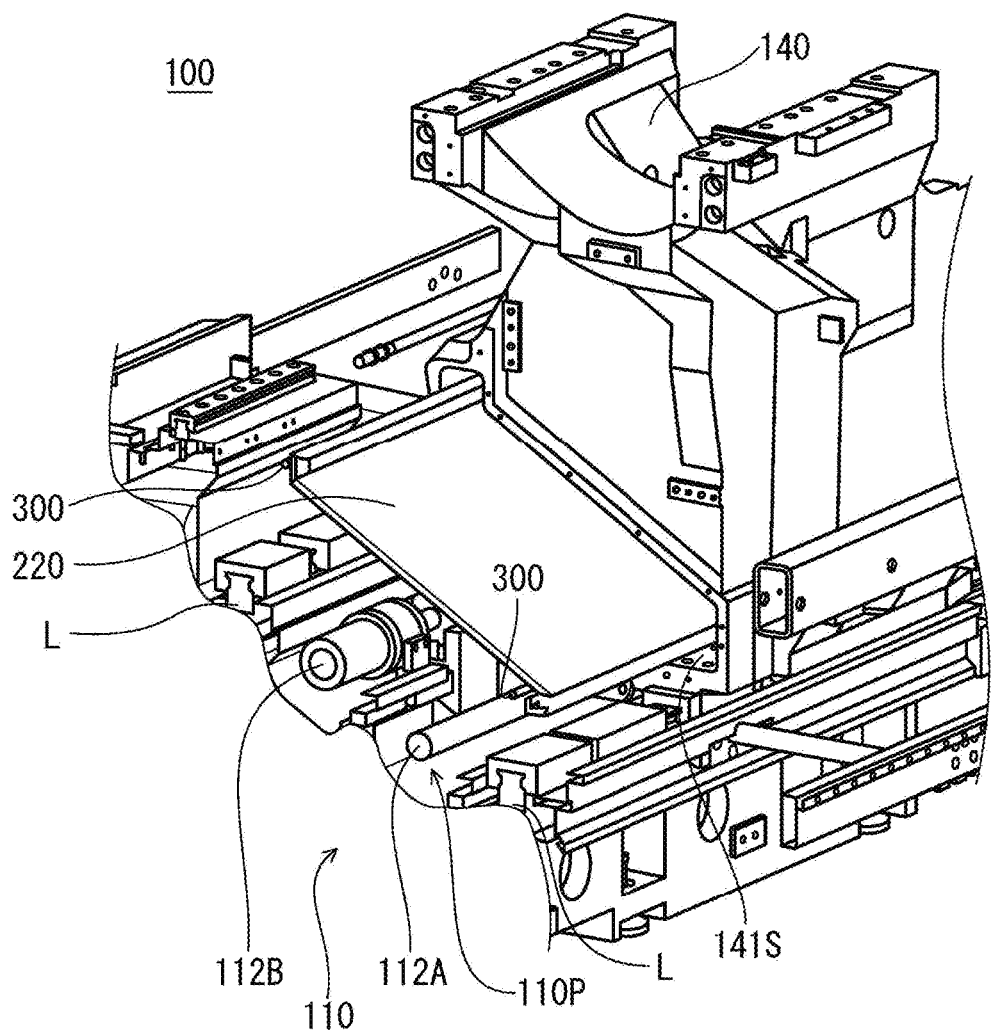
FIG. 5 is a perspective view of the protector housing portion of the second headstock, which is viewed obliquely from the upper side.
Figure 6:
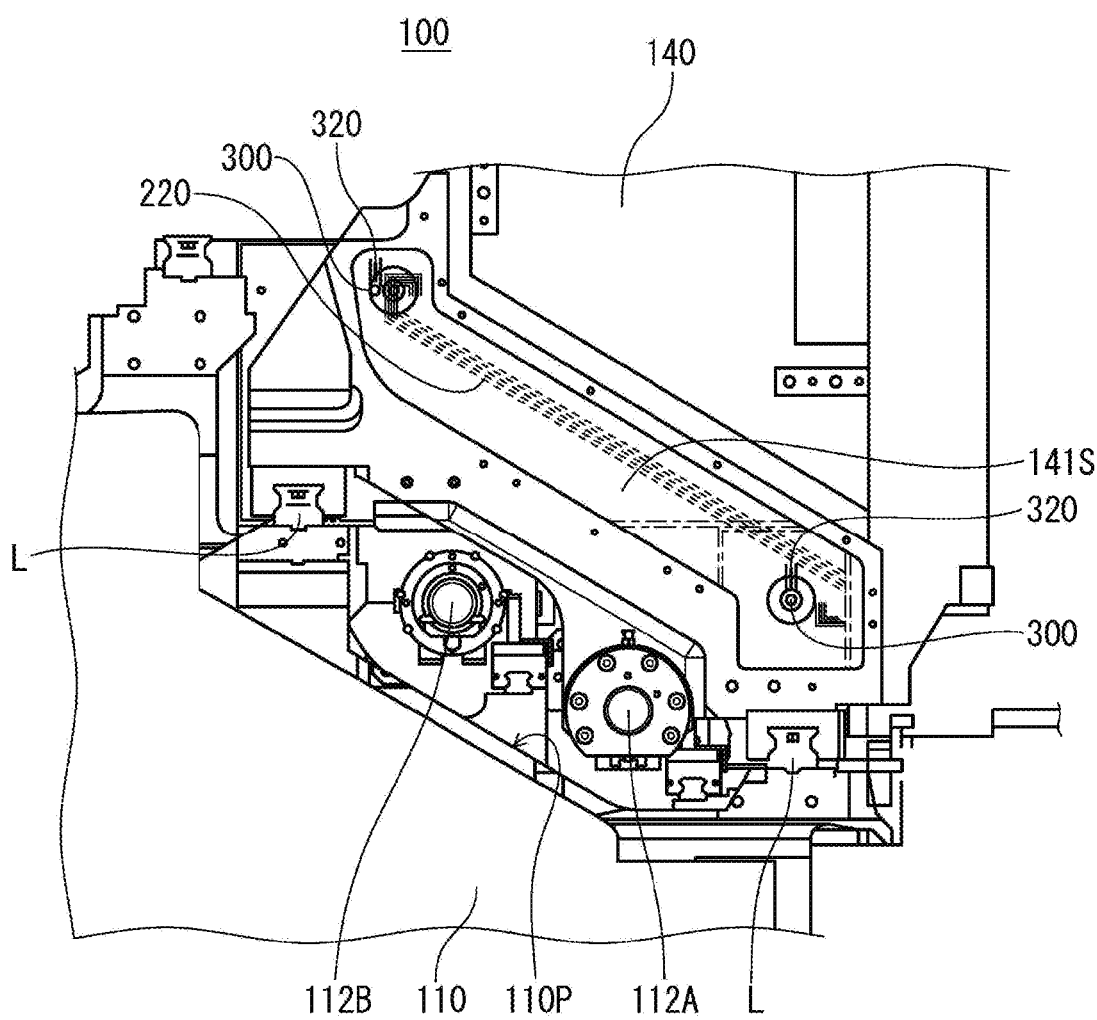
FIG. 6 is a side view of the second headstock, which is taken on the side of the protector housing portion.

FIG. 1 is a front view illustrating a configuration of an example of the machine tool according to the present embodiment and FIG. 2 is a perspective view illustrating a configuration of the machine tool. FIG. 3A is an enlarged view of a region A in FIG. 2 and FIG. 3B is an enlarged view of a region B in FIG. 2. FIG. 4 and FIG. 5 are perspective views of the protector housing portion of the second headstock, which are viewed obliquely from the lower side and the upper side, respectively. FIG. 6 is a side view of the second headstock, which is taken on the side of the protector housing portion.

As illustrated in FIGS. 1 and 2, a machine tool 100 includes a long slanting bed 110, which is placed over a floor in the horizontal direction, a tool post 120 (the first structure), which is mounted over an upper surface 110P of the bed so as to be horizontally movable, a first headstock 130, which is disposed on one side of the tool post 120, and a second headstock 140, which is disposed on the other side of the tool post 120 so as to be horizontally movable. The first headstock 130 is fixed to one end portion of the bed 110. The machine tool 100 is a form of a lathe.

In the illustration of each figure, details of, for example, support portions that support the first headstock, the second headstock, the tool post, and the guide rail are omitted. In FIG. 1, part of the protector is omitted.

As illustrated in FIGS. 4 to 6, the bed 110 is provided with a plurality of guide rails L, which run in the horizontal direction along the longitudinal direction thereof, and a first ball screw 112A and a second ball screw 112B, which allow the tool post 120 and the second headstock 140 to each move along a pair of the guide rails L. The tool post 120 and the second headstock 140 are both horizontally movable along the same guide rails.

As illustrated in FIGS. 2 and 3, the upper surface 110P of the bed 110 is covered with a combination of a first protector 210, a second protector 220, and a third protector 230. Further, the second protector 220 provided between the tool post 120 and the second headstock 140 covers both the first ball screw and the second ball screw at least partly. Each protector has a form of a telescopic cover that includes a plurality of cover bodies.

One end and the other end of the first protector 210 are connected to the first headstock 130 and the tool post 120, respectively. The first protector 210 extends and retracts with the movement of the tool post 120. One end and the other end of the second protector 220 are connected to the tool post 120 and the second headstock 140, respectively. The second protector 220 extends and retracts with the movement of the tool post 120 and the second headstock 140. One end and the other end of the third protector 230 are connected to end portions of the second headstock 140 and the bed 110, respectively. The third protector 230 extends and retracts with the movement of the second headstock 140.

As illustrated in FIGS. 4 to 6, the second headstock 140 is provided with a protector housing portion 141S that can house the second protector 220. Similarly, the first headstock 130 is provided with a protector housing portion that can house the first protector, which is not illustrated. Further, a protector housing portion may also be provided in the tool post 120. The protector housing portion 141S is a tunnel-like space provided in the base portion of the second headstock 140 and a casting constitutes the base portion. The tunnel-like space is formed as a cast hole when the base portion is formed.

The protector housing portion 141S of the second headstock 140 is opened in the movement direction of the tool post 120. The protector housing portion 141S of the second headstock 140 is opened toward the tool post 120. The protector housing portion 141S of the second headstock 140 lies along the movement direction of the tool post 120.

The protector housing portion of the first headstock 130 is opened in the movement direction of the tool post 120. The protector housing portion of the first headstock 130 is opened toward the tool post 120. The protector housing portion of the first headstock 130 lies along the movement direction of the tool post 120.

FIG. 1 illustrates the state where the tool post 120 and the second headstock 140 have sufficiently approached each other. Such an approach is enabled by causing the second protector 220 to be housed in the protector housing portion 141S provided in the base portion of the second headstock 140. Similarly, the first protector 210 is housed in the protector housing portion provided in the base portion of the first headstock 130.

The first protector 210 and the second protector 220 are supported by a pair of long members (round bars 300) provided in parallel from one end to the other end of the bed 110 in its longitudinal direction. In FIG. 2, the round bars 300 are conceptually depicted with broken lines. The round bars 300 are provided in parallel to the movement direction of the tool post 120 and the second headstock 140. Specifically, as illustrated in FIG. 3A, a pair of ring-like fasteners 113A for fixing respective ends of the pair of round bars 300 are provided at one end of the bed 110. One end of each of the pair of round bars 300 is engaged with the ring of the fastener 113A and fixed. Further, as illustrated in FIG. 3B, a pair of ring-like fasteners 113B similar to the above are provided at the other end of the bed 110. The other end of each of the pair of round bars 300 is connected to a turnbuckle 310 and the turnbuckle 310 is connected to the fastener 113B. Accordingly, the length of the round bar 300 is almost the same as the maximum length X of the bed 110.

The configuration where the first protector 210 and the second protector 220 are supported by the pair of round bars 300 so that each protector travels over the round bars 300 obviates the necessity to provide a member for supporting each protector over the upper surface 110P of the bed 110 or the guide rails L. That is, the protectors travel over the round bars 300 in the horizontal direction and are housed in the tunnel-like protector housing portion 141S provided in the base portion of the second headstock 140 and another unillustrated protector housing portion provided in the first headstock 130. Still another protector housing portion may be formed in the tool post 120 and each protector may pass through the protector housing portion concerned.

Figure 7:
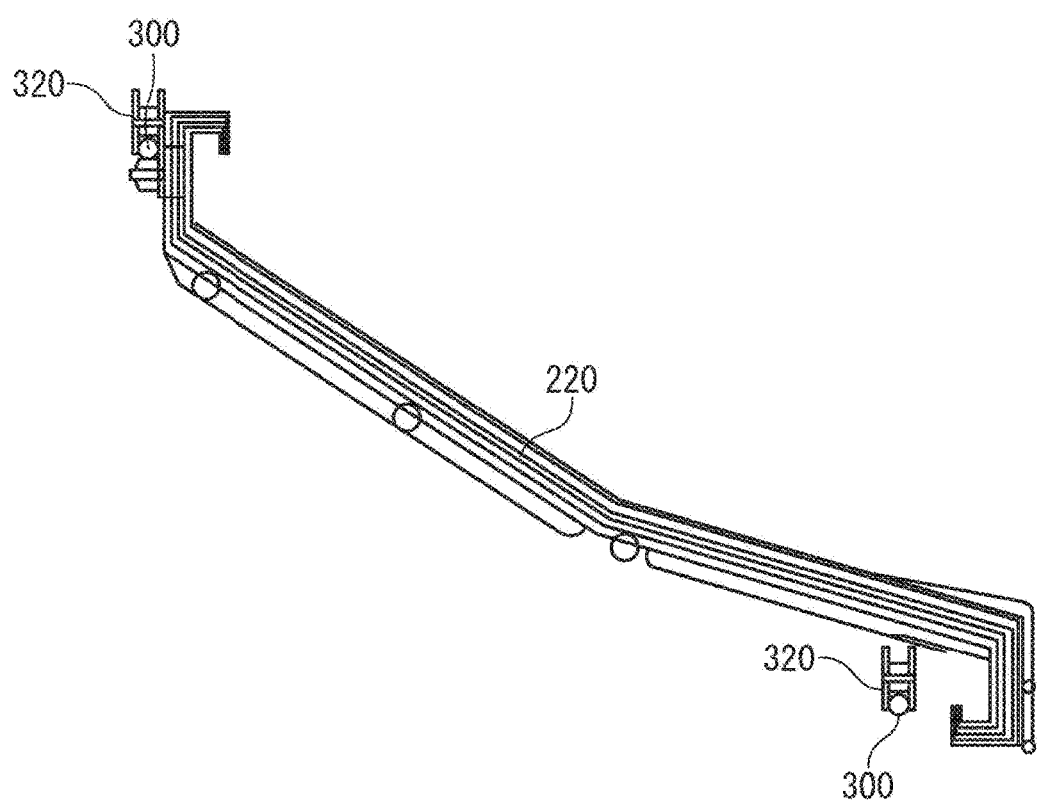
FIG. 7 is a diagram illustrating the relation between a rotor fixed to the protector wire rope.

As illustrated in FIG. 7, a pulley 320 is fixed in a position where each protector is in contact with the round bar 300. The direction in which the pulley 320 rotates is parallel to the round bar 300, and the extension and retraction and the movement of each protector are facilitated by the pulley 320 traveling over the round bar 300. The number of the pulleys 320 fixed to each protector may be one or be two or more.

Although each protector may be supported simply by the pair of round bars 300, at least one of the tool post 120 (the first structure) and the second headstock 140 (the second structure) may further be provided with a support member for supporting each protector. Thus, the round bars 300 can be supported at more support points and loosening of the round bar 300 can be inhibited.

Figure 8:
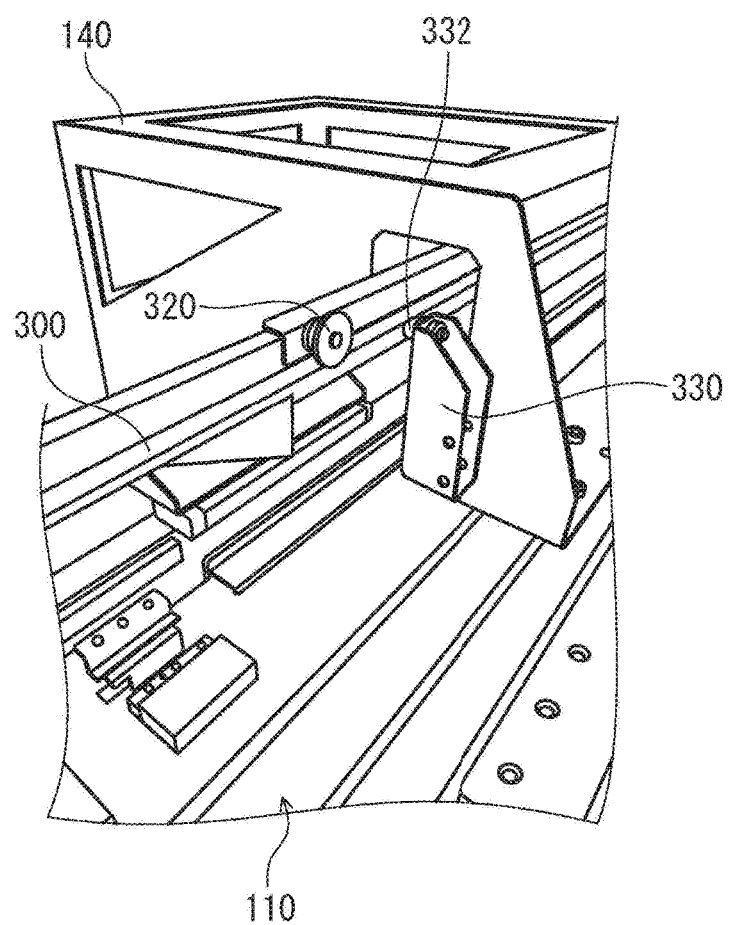
FIG. 8 is a perspective view illustrating a support member provided on a rear side surface of the second headstock.

FIG. 8 illustrates an example of the support member. In FIG. 8, a support member 330 is provided on a rear side surface of the second headstock 140. Although the support member 330 in the illustrated example includes a pulley 332, which rotates in parallel to the round bar 300, so as to, for example, reduce the resistance to the round bar 300, the configuration of the support member 330 is not particularly limited. In FIG. 8, the second headstock 140 is simplified when illustrated and a cover member of the protector is omitted.

The description of the embodiments above presents examples in every respect and not limiting. Those skilled in the art can make alterations and changes as appropriate. The scope of the present invention is indicated by the claims rather than the above-described embodiments. Further, the scope of the present invention includes changes from the embodiments within the claims and the scope equivalent thereto.

Although preferred embodiments of the present invention at this point in time are described, it is to be understood that such disclosure is not to be interpreted as limiting. Various alterations and modifications will no doubt become apparent to those skilled in the art to which the present invention pertains after they read the disclosure described above. Accordingly, it is intended that the appended claims be interpreted as covering all alterations and modifications while not deviating from the true spirit and scope of the invention.

INDUSTRIAL APPLICABILITY

The machine tool according to the present invention enables structures, such as a headstock and a tool post, to approach each other easily and the convenience of machining a workpiece by the machine tool can be increased.

REFERENCE SIGNS LIST

100: Machine tool, 110: Bed, 110P: Upper surface, 112A: First ball screw, 112B: Second ball screw, 113A, 113B: Ring-like fastener, 120 (First structure): Tool post, 130: First headstock, 140: Second headstock, 141S: Protector housing portion, 210: First protector, 220: Second protector, 230: Third protector, 300: Round bar, 310: Turnbuckle, 320: Pulley, 330: Support member, L: Guide rail

The invention claimed is:

1. A machine tool comprising:
   a bed that includes a guide unit;
   a first structure and a second structure that are each mounted over the bed;
   a first drive unit that moves the first structure in a movement direction along the guide unit;
   a second drive unit that moves the second structure in the movement direction along the guide unit; and
   a protector that covers at least part of the first drive unit and at least part of the second drive unit, wherein
   the protector is extendable and retractable in the movement direction with movement of the first structure, and
   a protector housing portion provided in the second structure, the protector housing portion defining a space extending through a base portion of the second structure, the protector housing portion being configured to house at least a portion of the protector to travel in the space in the movement direction; and
   wherein the first structure is a tool post of a steady rest, and
the second structure is a headstock of a tailstock.

2. The machine tool according to claim 1, wherein the protector comprises a first connection portion attached to the first structure and a second connection portion attached to the second structure, and wherein the first connection portion and the second connection portion are positioned away from each other in the movement direction.

3. The machine tool according to claim 1, wherein
the protector includes a plurality of cover bodies that are combined so as to be movable and so that an adjacent pair of the cover bodies overlap at least partly.

4. The machine tool according to claim 1, wherein
the protector housing portion is provided in the second structure and is open toward the first structure.

5. The machine tool according to claim 1, wherein
the protector is supported by a first support member provided along the movement direction of the first structure.

6. The machine tool according to claim 5, wherein
the protector includes a rotor that travels along the first support member when the protector extends and retracts.

7. The machine tool according to claim 5, wherein
the second structure includes at least one second support member that supports the first support member.

8. The machine tool according to claim 5, wherein
the first support member is a wire rope or a rod member.

9. The machine tool according to claim 1, wherein
the space extends through the base portion of the second structure in the movement direction of the first structure.

10. The machine tool according to claim 1, wherein the protector is a second protector, and wherein the machine tool further comprises:

a first protector and a third protector; and
wherein the second protector is provided between the first structure and the second structure.

11. The machine tool according to claim 10, wherein
the first protector is connected to the first structure, and extends and retracts with a movement of the first structure,
the second protector is connected to the first structure and the second structure, and extends and retracts with a movement of at least one of the first structure and the second structure, and
the third protector is connected to the second structure and extends and retracts with a movement of the second structure.

12. The machine tool according to claim 1, wherein the protector housing portion is provided in the second structure and is open toward the first structure.

13. The machine tool according to claim 1, wherein the guide unit is a horizontal rail that extends in the movement direction.

14. The machine tool according to claim 1, wherein
the first structure is a tool post, and
the second structure is a headstock.

15. The machine tool according to claim 1, wherein
the first structure is a tool post, and
the second structure is a tailstock.

16. The machine tool according to claim 1, wherein
the first structure is a steady rest, and
the second structure is a headstock.

17. The machine tool according to claim 1, wherein
the first structure is a steady rest, and
the second structure is a tailstock.

18. The machine tool according to claim 1, wherein the machine tool is a lathe.

* * * * *